(12) United States Patent
Moore

(10) Patent No.: US 7,555,191 B1
(45) Date of Patent: Jun. 30, 2009

(54) SELF-LOCKING UNIDIRECTIONAL INTERPOSER SPRINGS FOR OPTICAL TRANSCEIVER MODULES

(76) Inventor: Joshua John Edward Moore, 1063 Morse Ave., Apt. 15-104, Sunnyvale, CA (US) 94089

( * ) Notice: Subject to any disclaimer, the term of this patent is extended or adjusted under 35 U.S.C. 154(b) by 0 days.

(21) Appl. No.: 12/022,879

(22) Filed: Jan. 30, 2008

(51) Int. Cl.
*G02B 6/00* (2006.01)
*H01R 33/945* (2006.01)
*H04B 10/00* (2006.01)

(52) U.S. Cl. .......................... 385/136; 385/76; 385/77; 385/92; 385/134; 439/577; 439/607; 398/135; 398/138; 398/139

(58) Field of Classification Search ............... 385/53, 385/88, 89, 76, 77, 78, 92, 93, 94, 139, 62, 385/81, 14, 134, 135, 136; 398/135, 138, 398/139; 439/577, 607
See application file for complete search history.

(56) References Cited

U.S. PATENT DOCUMENTS

| | | | | |
|---|---|---|---|---|
| 3,317,885 | A * | 5/1967 | Yost ........................ | 439/631 |
| 4,041,952 | A * | 8/1977 | Morrison et al. ............... | 606/42 |
| 4,804,243 | A * | 2/1989 | Borsuk et al. ................. | 385/76 |
| 6,005,186 | A | 12/1999 | Bachman ................... | 174/35 R |
| 6,095,862 | A | 8/2000 | Doye et al. .................. | 439/607 |
| 6,430,061 | B1 * | 8/2002 | Grant et al. ................. | 361/816 |
| 6,478,622 | B1 | 11/2002 | Hwang ....................... | 439/607 |
| 6,752,663 | B2 | 6/2004 | Bright et al. ................ | 439/607 |
| 6,893,293 | B2 | 5/2005 | Ice et al. ..................... | 439/607 |
| 6,943,287 | B2 | 9/2005 | Lloyd et al. ................. | 174/52.1 |
| 7,001,217 | B2 | 2/2006 | Bright et al. ................ | 439/609 |
| 7,150,653 | B1 | 12/2006 | Mason ........................ | 439/609 |
| 7,172,346 | B2 | 2/2007 | Mader et al. .................. | 385/92 |
| 7,182,524 | B2 * | 2/2007 | Kramer et al. ................ | 385/78 |
| 7,357,581 | B2 * | 4/2008 | Goffhe et al. ................. | 385/92 |
| 2007/0140626 | A1 | 6/2007 | Chan .......................... | 385/89 |

* cited by examiner

*Primary Examiner*—Brian M Healy
(74) *Attorney, Agent, or Firm*—William S. Parks; Wyatt, Tarrant & Combs LLP

(57) ABSTRACT

This invention relates to novel latching mechanisms for a pluggable assembly or module that comprises a communications interface between a computer processing unit and the housing of an optical transceiver (such as a XENPAK module). Such connections require multiple flexible spring configurations to ground the module housing to the CPU circuit board. Such flexible spring configurations must exhibit sufficient strength to allow for flexion upon introduction of the housing within a slot within a CPU, yet sufficient force as well to reliably maintain contact of the conductive springs on the optical transceiver to a grounding strip on the CPU circuit board. Furthermore, the springs themselves must release upon application of sufficient force as the user slides the transceiver housing from the CPU slot as well. In this manner, a more reliable manner of permitting smooth introduction of an optical transceiver housing within a CPU as well as omitting of potential damaging obstacles such as indentations or other like notches within the transceiver housing has been provided. The actual spring configuration itself is encompassed within this invention, as is the optical transceiver housing including such multiple spring configurations.

10 Claims, 4 Drawing Sheets

SELF-LOCKING UNIDIRECTIONAL INTERPOSER SPRINGS FOR OPTICAL TRANSCEIVER MODULES

FIELD OF THE INVENTION

This invention relates to novel latching mechanisms for a pluggable assembly or module that comprises a communications interface between a computer processing unit and the housing of an optical transceiver (such as a XENPAK module). Such connections require multiple flexible spring configurations to ground the module housing to the CPU circuit board. Such flexible spring configurations must exhibit sufficient strength to allow for flexion upon introduction of the housing within a slot within a CPU, yet sufficient force as well to reliably maintain contact of the conductive springs on the optical transceiver to a grounding strip on the CPU circuit board. Furthermore, the springs themselves must release upon application of sufficient force as the user slides the transceiver housing from the CPU slot as well. In this manner, a more reliable manner of permitting smooth introduction of an optical transceiver housing within a CPU as well as omitting of potential damaging obstacles such as indentations or other like notches within the transceiver housing has been provided. The actual spring configuration itself is encompassed within this invention, as is the optical transceiver housing including such multiple spring configurations.

BACKGROUND OF THE PRIOR ART

In order to permit add-ons to computer processor units (CPUs), housing assemblies have been provided that include a variety of optical transceivers with proper connections to complementary connections within such CPUs. The optical transmit portion of an optical transceiver typically contains very delicate photodiodes and/or similar optical provisions and, in turn, couples to a driver board within the target CPU. The housing assembly protects such delicate components from damaging contact and/or environmental conditions. Optical transceivers are packaged in housing assemblies that are configured in a number of standard forms. Standard forms, such as industry standards X2, XFP, or XENPAK housings, provide standardized dimensions and input/output layouts that allow devices from different manufacturers to be used interchangeably within various CPUs.

The delicate nature of such connections, as well as the important tasks involved of transferring large amounts of information quickly and reliably has required that such housing assemblies include means for effective introduction within a target CPU, as well as correct placement for proper connections between the transceiver and the internal CPU component. Generally, such housing assemblies are oblong in shape with two short ends, one for introduction within the CPU and including the connection means (the site for information transfer, in essence from the transceiver to the CPU). The second short end will, upon introduction and connection within such CPU, will remain external to the CPU and will include a securing mechanism (such as one or more screws) to temporarily though securely attach the housing assembly to the CPU. The housing assemblies thus also include two long ends opposite one another that guard the internal portions of the transceiver from contact with the internal portions of the CPU, and are generally shaped to be complementary to notches or indentations within the CPU as well. These long ends thus are generally shaped with extensions from the sides of the transceiver. Examples of such housing assemblies of this shape and configuration are provided within U.S. Pat. No. 7,150,653 to Mason.

Such previously provided housing assemblies include a number of means for securing such assemblies within a receptacle of the target CPU (such as on a driver board connection). Primarily, there has been used indentations or bumps within the peripheries of the long ends of such assemblies that are themselves complementary to notches or extensions within the internal portions of the CPU receptacle. Similarly flexible springs were introduced into the XENPAK form factor to bias the housing in one direction and to provide a grounding connection between the transceiver housing and the CPU main circuit board. However, it has been realized now that current configurations actually create suspect connections due to potentially uneven introduction of the housing assembly within the CPU receptacle (as at a skewed angle or pitch) or potentially through damage to the transceiver components (due to jarring movements during introduction with such indentations and/or bumps). Many current designs use additional fasteners and multiple piece parts to create these flexible springs. This adds complexity and cost to the current housing designs. In any event, it was discovered that a different manner of permitting smooth, reliable, and even introduction of a housing assembly within a target CPU receptacle was necessary to overcome these shortcomings in the prior housing assembly designs.

SUMMARY AND ADVANTAGES OF THE INVENTION

It is an advantage of the current development to provide a housing that is introduced within a CPU receptacle with a non-jarring motion as well as a perfect alignment with the target connection. Another advantage of such a development is a more reliable connection between the delicate optical components of a transceiver and the CPU driver board. A further advantage of this development is a simple manner of producing a housing assembly with the proper configuration permitting attachment of multiple flexible tension means to the long, outer ends of a housing assembly. Yet another advantage of this development is the simplified manner of producing multiple flexible tension means having the exact same size, shape and configuration for attachment on either long end of a housing assembly.

Accordingly, this inventive development encompasses a flexible spring device produced from a single strand of surface conductive material, wherein said device is manipulated to provide two parallel extensions with a spacer component present therebetween, wherein said spacer component has two ends thereof, and wherein each of said two ends exhibits two separate bends therein, wherein each bend is from 45 to 135°, preferably from 75 to 115°, most preferably at 90°, from the plane of the spacer component. A housing assembly including such a flexible spring device is encompassed as well within this invention. Furthermore, also included within this invention is a housing assembly for an optical transceiver for introduction within a computer processing unit receptacle, said assembly configured in a general rectangular shape having two short ends and two long ends, a first short end including a connection means for connection with a driver board within said computer processing unit, said second end configured for placement external of said computer processing unit, and said two long ends including identical peripheral edges and including identical means for introducing identical flexible grounding spring devices therein, wherein said identical peripheral edges are smooth and exhibit no indentations therein, wherein said identical peripheral edges are complementary to the internal configuration of said computer processing receptacle, and wherein said identical flexible spring devices attached to both long ends of said housing assembly provide continuous contact to the CPU circuit board during installation of the transceiver module.

In such a manner, the flexible spring devices defined above permit a smooth glide to the long ends of the subject housing assembly during introduction of the assembly within a CPU receptacle. Such spring devices are configured at a slight curve with the ends not attached to the metal spacer component directed toward the short end of the housing assembly to be external of the CPU receptacle after introduction therein. These slightly curved ends will thus flatten to the flat level of the peripheral edges of the housing assembly long ends to fit securely and properly between the complementary indentations present within the CPU receptacle. In such a manner, the tension provided by such flattened spring devices, in addition to the size and configuration of the peripheral edges of the long ends of the housing assembly, will create a reliable securing force to maintain grounding contact between the housing assembly and the CPU circuit board unless a sufficient force is applied thereto to remove the assembly (such as through pulling the assembly from the receptacle).

Such a simple mechanism is accomplished through the utilization of the above-defined spring devices. Such devices provide benefits above and beyond these smooth introduction possibilities. In the past, spring devices have been utilized in addition to indentations and other clip-type securing means within the peripheral edges of housing assembly long ends. However, such spring devices, in addition to being a supplemental means for securing such assemblies within CPU receptacles, have been produced specifically depending on the side on which the spring is placed for eventual utilization. Generally, the attachment points of such previous spring devices required particular deployment in relation to the specific long end side on which they are present. A left-side attachment point would require the supplemental spring device to extend in a specific direction in relation to the left-side of the housing assembly; likewise, the right-hand side would be configured opposite that of the left-hand side. As a result, increased complexity in manufacturing was necessary to accord the supplemental spring device securing means to the subject housing assembly.

To the contrary, the inventive spring device development provides a simple manufacturing scheme for producing the smooth-edged, though reliable securing housing assembly. Such inventive spring devices are identical in shape and configuration, regardless of the long end side to which they are attached. Additionally, the housing assembly long ends include openings within the inner portions of the extended peripheral edges that are complementary in shape to the bent portions of the metal spacer components of the spring devices. In such a way, two springs may be simultaneously applied to one side of a long end of a peripheral edge of a housing assembly at a time and may be sufficient for the desired degree of smooth introduction and securing of the housing assembly within a subject CPU receptacle. Likewise, two springs may be applied via a single spring device on the opposite side of the housing assembly long end as well. Of course, multiple springs (and thus spring devices) may be utilized for such a purpose, as long as there are present in multiples of twos. Thus, there is significant benefit not just with the ability to provide smooth and reliable introduction and securing of a housing assembly within a subject CPU receptacle, but also through the simplicity in providing one single type of spring device for such a purpose and function.

The invention is also designed in combination with the main transceiver housing to require no adhesives, additional fasteners, or secondary assembly steps. The springs are installed from below the module through holes in the side rails. These holes are shaped specifically to prevent the springs from being installed backwards or opposite their intended direction. The springs then lock into the housing a locking tab that keys into a hole on the transceiver housing. These features allow the design to be securely attached to the housing in the correct orientation without adhesive or other attachment means, as well as being able to use the same spring design and shape for both the left and right side rails of the module housing.

DETAILED DESCRIPTION OF THE DRAWINGS AND PREFERRED EMBODIMENTS

It is not intended that these drawings constitute any limitations upon the inventive device and/or apparatus.

Figure 1:
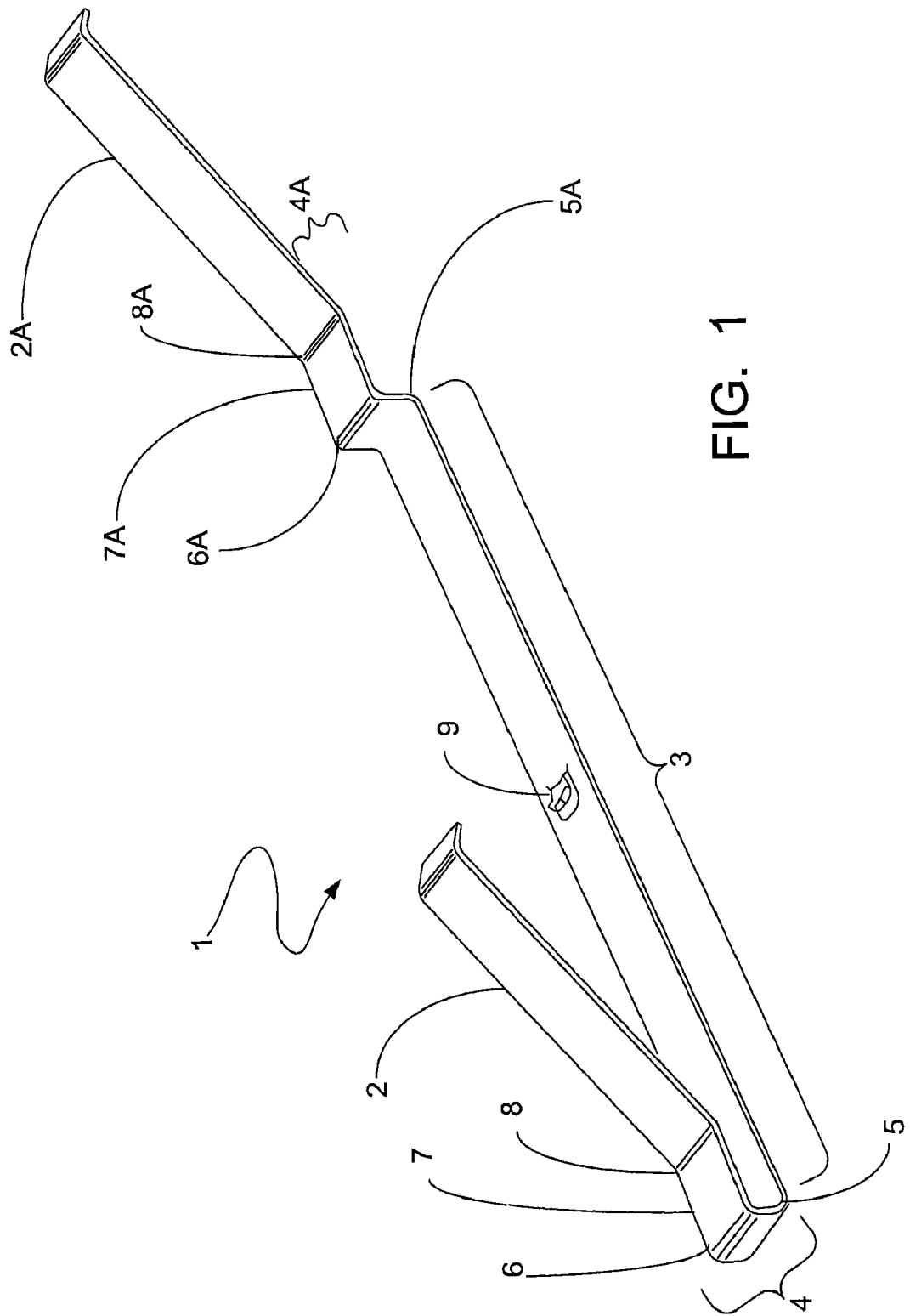
FIG. 1 is a side perspective view of an inventive spring device.

FIG. 1 provides a depiction of the inventive spring device 1 made from a single strand of material that exhibits proper conduction of electricity to act as a proper grounding implement, as well as proper flexibility to retain its shape and continue proper grounding capability after repeated introductions within and from a CPU receptacle (not illustrated). Such a material is metal in nature, or a metal-plated or -painted flexible material (such as a plastic). Preferably, the device 1 is made from 301 or 302 steel, tin, gold-plated brass, or gold-plated steel, or any other like surface conductive material. The preferred single 301 steel strand device 1 includes first and second parallel ends 2, 2A that are disposed at an angle from and are separated by a middle flat section 3. The portions of the first and second parallel ends 2, 2A that are adjacent to said middle flat section 3 include bent portions 4, 4A that are shaped complementary to openings in a target pluggable housing assembly (such as 10 in FIG. 2) for easy introduction and reliable connection to such assembly. Such bent portions 4, 4A include one a preferred 90° bend 5 of the steel strand 1 from the plane of the middle flat section 3, and a subsequent preferred 90° bend 6 from the plane of the strand of the first bend 5 such that the strand 1 then includes an elevated portion 7 of the first parallel end 2 that is parallel itself to and is located directly over a small portion of the middle flat section 3. From there, a further bend 8 of 30° (such an angle may be from 1 to 89° from the target plane, with 20-60° preferred and from 25-35° still more preferred) in the strand 1 from the plane of the parallel end portion 7 is present which constitutes the first parallel end 2 of the spring device 1. Likewise, such bent portions include another preferred 90° bend 5A of the steel strand 1 from the plane of the middle flat section 3, and a subsequent preferred 90° bend 6A from the plane of the strand of the first bend 5A such that the strand 1 then includes an elevated portion 7A of the second parallel end 2A that is bent away from the middle flat section 3, but is in the same plane as elevated portion 7 of said first parallel end 2. From there, a further bend 8A of 30° (with the same possible angles as noted above) in the strand 1 from the plane of the parallel end elevated portion 7A is present which constitutes the first parallel end 2A of the spring device 1 The middle flat section 3 also includes, optionally, a protruding tab portion 9 that is configured complementary to a slot (not illustrated) present on a target housing assembly (10 in FIG. 2, for instance) to permit more reliable attachment of the spring device 1 thereto. Such bent portions 4, 4A may be of any angle from that of the middle flat section 3 (also referred to as a spacer portion); however it is preferred that such an angle be at least 45 degrees and at most 135 degrees, with 75 and 105 degrees more preferred, and 90 degrees most preferred. Coupled with the optional protruding slot 9 on the spring device 1, these bent portions 4, 4A, themselves configured to accept complementary edge portions of a cut-out within a targeted housing assembly (10 in FIG. 2), all permit attachment of said device 1 to a housing assembly (10 in FIG. 2) by passing each of said first and second parallel ends 2, 2A through said cut-out portions (not illustrated) of a target housing assembly (10 in FIG. 2), sliding the edge portions of such cut-outs under the elevated portions 7, 7A of the first and second parallel ends 2, 2A, over the spacer section 3, and inserting the protruding tab 9 into a complementary slot (not illustrated) in the housing assembly (10 in FIG. 2). Being produced from a single strand, and including two spring portion ends 2, 2A, this spring device 1 provides an efficient manner of grounding a target assembly to a CPU receptacle (partial view in FIG. 2 as 12, for instance). Furthermore, each spring device is identical and no further spring devices of differing shape or configuration are required for proper grounding purposes for such CPUs.

Figure 2:
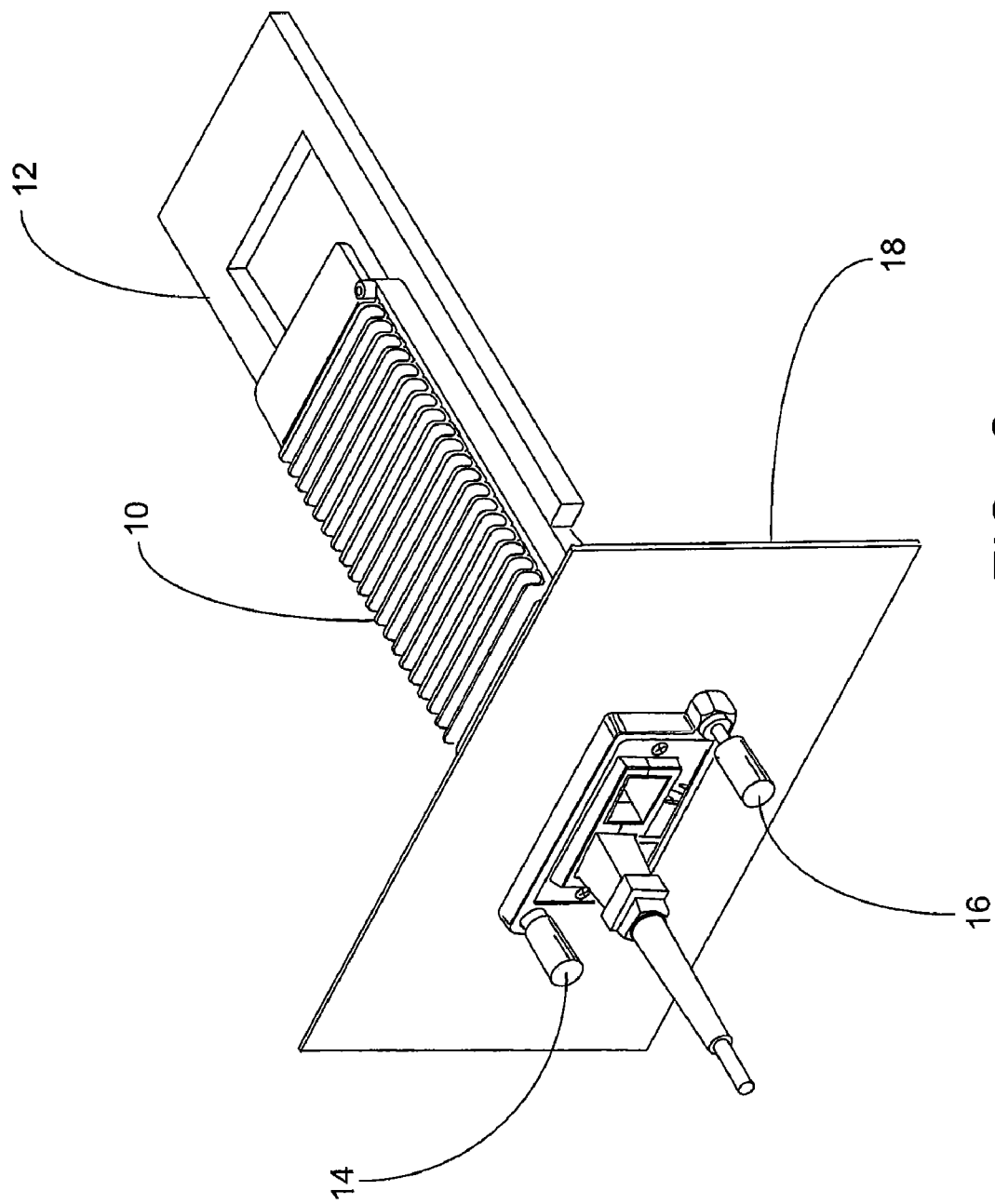
FIG. 2 is an elevated perspective view of a pluggable housing assembly when partially introduced within a CPU receptacle.

In FIG. 2 the pluggable housing assembly 10 is partially introduced within a CPU receptacle (not illustrated) via partial introduction within a grounding component 12. The housing assembly 10 includes an optical transceiver with a connector (120 in FIG. 3, for example) that will connect within the CPU upon full introduction within the receptacle. Upon full introduction, a faceplate 18 will flush with the CPU exterior (not illustrated) and two screws 14, 16 can be employed to secure the assembly 10 within the CPU receptacle (12, as above) for continuous transfer of data as needed.

Figure 3:
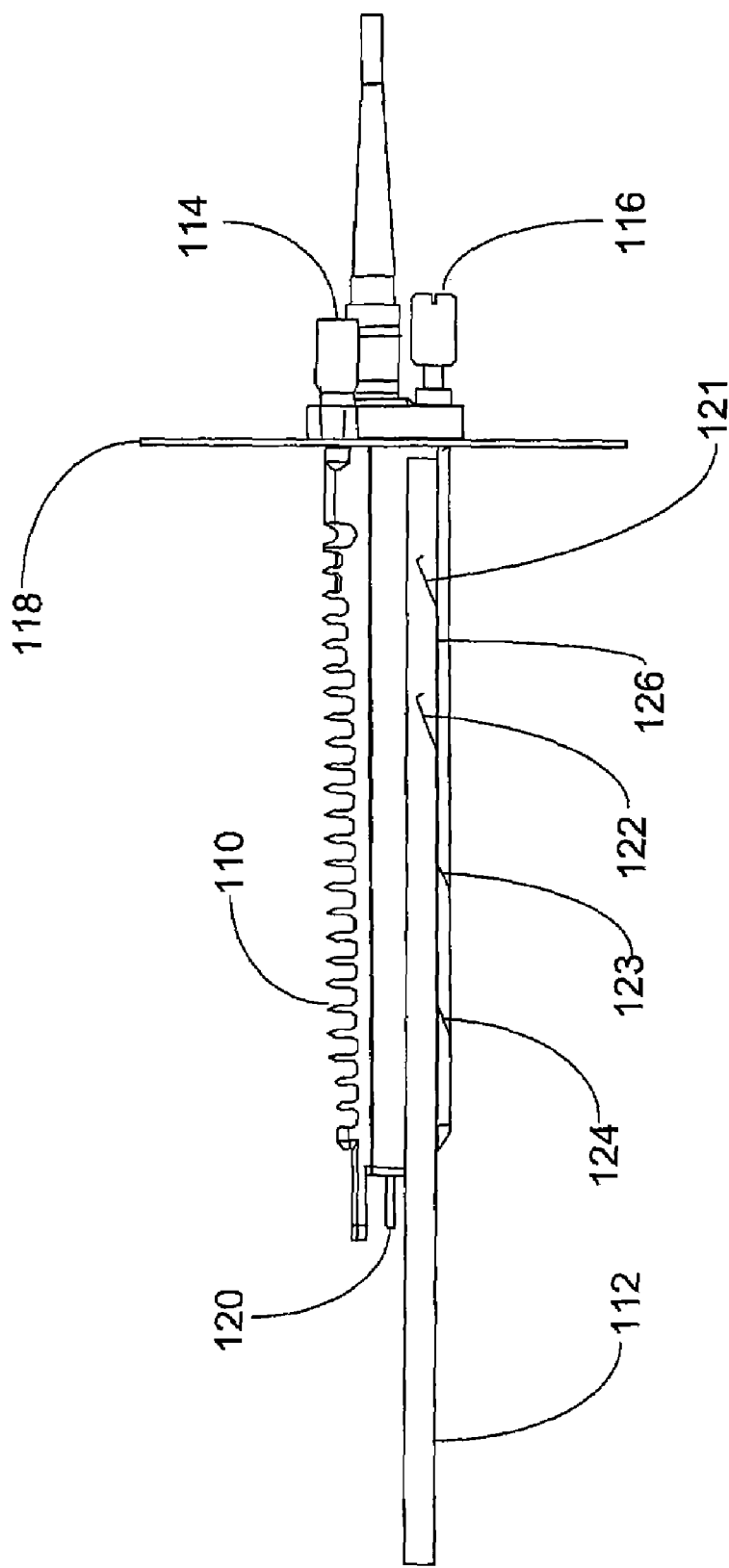
FIG. 3 is a side, perspective view of the same pluggable housing assembly when partially introduced within a CPU receptacle.

FIG. 3 thus shows a side view of FIG. 2 with a better view of the springs 121, 122, 123, 124 prior to and during employment as grounding portions. AS in FIG. 2, the housing assembly 110 slides onto a grounding component 12 upon introduction within a CPU receptacle (not illustrated). A connector 120 on the housing 110 is present as a data transfer component with the CPU upon full introduction. The faceplate 118 and screws 114, 116 and present and are employed in the same manner. The grounding component 112 slides within a groove 126 on the housing assembly 110 (FIG. 3 depicts only one of the two grooves present) with four springs present 121, 122, 123, 124 that flex downward upon contact with the grounding component through sliding relation into the groove 126. In FIG. 3, however, two first springs 123, 124 are already in contact with the grounding component 112 while the two second springs 121, 122 are not. In relation to FIG. 1, above, the two first springs 123, 124 and two second springs 121, 122 are each made from a single spring device (1 in FIG. 1).

Figure 4:
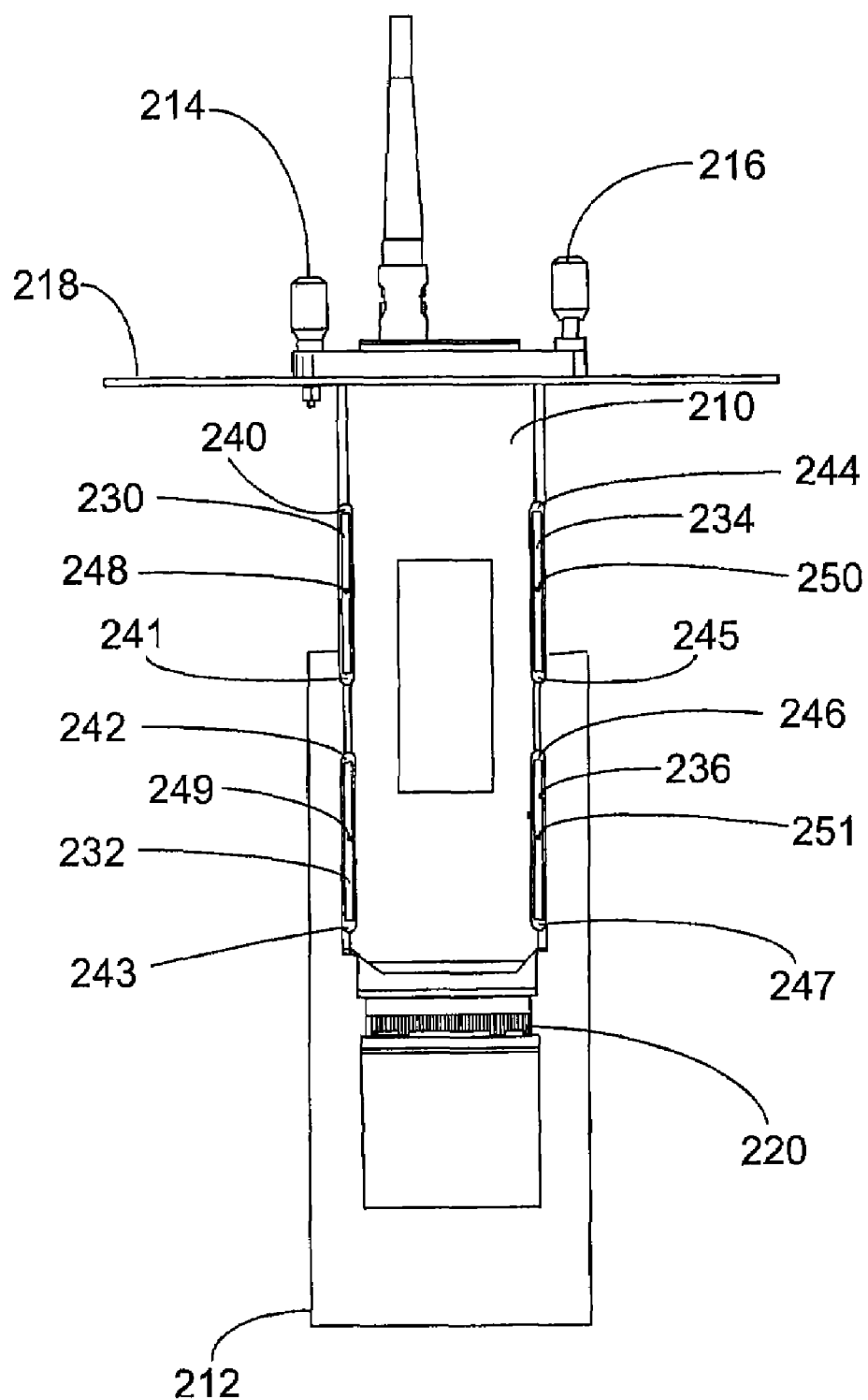
FIG. 4 is a bottom view of the housing assembly when partially introduced within a CPU receptacle.

In FIG. 4, then, it is possible to view the middle flat sections 230, 232, 235, 236 of the four spring devices 221, 222, 223, 224 present within the housing assembly 210. On the bottom of the assembly 210, there are eight openings 240, 241, 242, 243, 244, 245, 246, 247 that complementary in shape to the bent portions (4, 4A of FIG. 1) of the spring devices 221, 222, 223, 224 to facilitate entry and secure connection of the spring devices 221, 22, 223, 224 within the housing assembly 210. As well, there are slots (not illustrated) present within the bottom the housing assembly 10 into which the optional protruding tabs 248, 249, 250, 251 present within the spring devices 221, 222, 223, 224 are introduced (such as in a snapping manner, or other like detachable possibility). Thus, the grounding component 212 may be slid over the spring devices 221, 222, 223, 224 during introduction of the assembly 210 within a CPU receptacle (as described above in greater detail) with the housing assembly connector 220 in place for data transfer to the CPU and the face plate 218 and screws 214, 216 ready for employment to secure the assembly 210 as well.

A specific embodiment of a pluggable housing assembly has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A flexible spring device produced from a single strand of surface conductive material, wherein said device is manipulated to provide two parallel extensions with a spacer component present therebetween, wherein said spacer component has two ends thereof, and wherein each of said two ends exhibits two separate bends therein, wherein each bend is from 45 to 135° from the plane of the spacer component.

2. The spring device of claim 1 wherein each bend of said two ends is from 75 to 1150.

3. The spring device of claim 2 wherein each bend is 90°.

4. The spring device of claim 1 wherein said surface conductive material is selected from the group consisting of steel, tin, brass, metal-plated steel, metal-plated plastic, metal-painted plastic, and metal-plated brass.

5. A housing assembly for an optical transceiver for introduction within a computer processing unit receptacle, said assembly configured in a general rectangular shape having two short ends and two long ends, a first short end including a connection means for connection with a driver board within said computer processing unit, said second end configured for placement external of said computer processing unit, and said two long ends including identical peripheral edges and including identical means for introducing at least one of said flexible spring devices as in claim 1 therein on each of said two long ends, wherein said identical peripheral edges are complementary to the internal configuration of said computer processing receptacle, and wherein said flexible spring devices attached to both long ends of said housing assembly provide continuous contact to the CPU circuit board during installation of the transceiver module.

6. The housing assembly of claim 5 wherein said spring devices are made from surface conductive material selected from the group consisting of steel, tin, brass, metal-plated steel, metal-plated plastic, metal-painted plastic, and metal-plated brass.

7. The housing assembly of claim 5 wherein each of said long ends includes at least two of said flexible spring devices.

8. The housing assembly of claim 6 wherein each of said long ends includes at least two of said flexible spring devices.

9. A housing assembly for an optical transceiver for introduction within a computer processing unit receptacle, said assembly configured in a general rectangular shape having two short ends and two long ends, a first short end including a connection means for connection with a driver board within said computer processing unit, a second short end configured for placement external of said computer processing unit, and said two long ends including identical peripheral edges and including identical means for introducing identical flexible spring devices therein, wherein said identical peripheral edges are smooth and exhibit no indentations therein, wherein said identical peripheral edges are complementary to the internal configuration of said computer processing receptacle, and wherein said identical flexible spring devices attached to both long ends of said housing assembly provide continuous contact to the CPU circuit board during installation of the transceiver device.

10. The housing assembly of claim 9 wherein at least two of said identical flexible spring devices is attached to each of said long ends of said housing assembly.

* * * * *